United States Patent
Galioto et al.

(10) Patent No.: US 9,979,248 B2
(45) Date of Patent: May 22, 2018

(54) SHORT CIRCUIT FAULT TOLERANT PERMANENT MAGNET MACHINE

(71) Applicant: GENERAL ELECTRIC COMPANY, Schenectady, NY (US)

(72) Inventors: Steven Joseph Galioto, Waterford, NY (US); Manoj Ramprasad Shah, Latham, NY (US); Patel Bhageerath Reddy, Schenectady, NY (US); Nathaniel Benedict Hawes, Ballston Spa, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 206 days.

(21) Appl. No.: 14/754,138

(22) Filed: Jun. 29, 2015

(65) Prior Publication Data

US 2016/0380495 A1    Dec. 29, 2016

(51) Int. Cl.
*H02K 3/28* (2006.01)
*H02K 3/12* (2006.01)
(Continued)

(52) U.S. Cl.
CPC ............... *H02K 3/28* (2013.01); *H02K 1/16* (2013.01); *H02K 1/274* (2013.01); *H02K 3/12* (2013.01);
(Continued)

(58) Field of Classification Search
CPC    H02K 1/14; H02K 1/146; H02K 1/16; H02K 1/165; H02K 3/00; H02K 3/04;
(Continued)

(56) References Cited

U.S. PATENT DOCUMENTS 2,710,931 A    6/1955  Josef et al.
3,083,310 A    3/1963  Tweedy et al.
(Continued)

FOREIGN PATENT DOCUMENTS

CA    2454652 A1    2/2003
CN    102195370 A   9/2011
(Continued)

OTHER PUBLICATIONS

Campbell, Peter, et al., "The Effect of Iron Powders on the Utilization of Permanent Magnet Materials In Advanced Motors", Magnetics, IEEE Transactions, vol. 16, Issue: 5, pp. 690-692, Sep. 1980.
(Continued)

*Primary Examiner* — Tran Nguyen
(74) *Attorney, Agent, or Firm* — Nitin N. Joshi

(57) ABSTRACT

A permanent magnet (PM) machine includes a rotor and a stator assembly. The rotor includes a plurality of permanent magnets disposed about an axis of rotation. The stator assembly includes a stator body, a plurality of coil sides and a plurality of sintered iron magnetic wedges. The stator body includes a plurality of stator teeth defining a plurality of stator slots, each stator slot having an inside position and an outside position, such that each of the plurality of stator slots includes a first plurality of inside positions, and a first plurality of outside positions. The first plurality of coil sides are disposed in each of the first plurality of inside positions and the first plurality of outside positions. The first plurality of coil sides correspond to a first power phase. The first plurality of coil sides are electrically coupled to one another by a first plurality of end-coils. The plurality of sintered iron magnetic wedges are disposed at the openings of at least one stator slot of the plurality of stator slots.

16 Claims, 4 Drawing Sheets

(51) Int. Cl.
  *H02K 1/16* (2006.01)
  *H02K 1/27* (2006.01)
  *H02K 21/14* (2006.01)

(52) U.S. Cl.
  CPC ......... *H02K 21/14* (2013.01); *H02K 2213/03* (2013.01)

(58) Field of Classification Search
  CPC .. H02K 3/12; H02K 3/18; H02K 3/24; H02K 3/28; H02K 3/40; H02K 3/49; H02K 3/493; H02K 21/22
  See application file for complete search history.

(56) References Cited

U.S. PATENT DOCUMENTS

| | | | | |
|---|---|---|---|---|
| 3,705,343 | A * | 12/1972 | Ringland | G08C 19/40 318/659 |
| 4,998,032 | A * | 3/1991 | Burgbacher | H02K 29/03 310/156.45 |
| 5,530,307 | A | 6/1996 | Horst | |
| 5,654,603 | A | 8/1997 | Sung et al. | |
| 5,691,590 | A * | 11/1997 | Kawai | H02K 3/18 310/180 |
| 5,808,392 | A | 9/1998 | Sakai et al. | |
| 6,166,471 | A * | 12/2000 | Kometani | H02K 19/22 310/179 |
| 6,262,508 | B1 * | 7/2001 | Shibayama | H02K 21/00 310/152 |
| 6,323,574 | B1 * | 11/2001 | Takura | H02K 3/28 310/179 |
| 6,703,747 | B2 * | 3/2004 | Kawamura | H02K 3/28 310/179 |
| 6,759,780 | B2 * | 7/2004 | Liu | H02K 3/28 29/596 |
| 6,874,221 | B2 | 4/2005 | Jansen et al. | |
| 6,933,646 | B2 | 8/2005 | Kinoshita | |
| 7,443,070 | B2 | 10/2008 | Dooley et al. | |
| 8,129,880 | B2 | 3/2012 | Rahman et al. | |
| 2005/0206263 | A1 * | 9/2005 | Cai | H02K 3/12 310/198 |
| 2010/0090557 | A1 | 4/2010 | El-Refaie et al. | |
| 2010/0127591 | A1 * | 5/2010 | Court | H02K 3/28 310/202 |
| 2010/0201219 | A1 | 8/2010 | Moellgaard et al. | |
| 2011/0148241 | A1 * | 6/2011 | Miyata | H02K 3/28 310/195 |
| 2014/0028145 | A1 * | 1/2014 | Luise | H02K 3/493 310/214 |
| 2014/0300238 | A1 | 10/2014 | Lau et al. | |

FOREIGN PATENT DOCUMENTS

| | | | | |
|---|---|---|---|---|
| EP | 0052878 | * | 6/1982 | |
| EP | 2169809 | A1 * | 3/2010 | ............ H02K 3/493 |
| GB | 1230815 | A | 5/1971 | |
| GB | 1302307 | A | 1/1973 | |
| JP | 2002165428 | A * | 6/2002 | ............ H02K 1/14 |
| JP | 2004120827 | A | 4/2004 | |
| JP | 2007306797 | A * | 11/2007 | ............ H02K 1/14 |
| WO | 9843340 | A1 | 10/1998 | |

OTHER PUBLICATIONS

Mitcham, A. J., et al., "Implications of shorted turn faults in bar wound PM machines", Proc. Inst. Elect. Eng.—Elect. Power Appl., vol. 151, No. 6, pp. 651-657, Nov. 2004.

Gerada, C., et al., "The Results Do Mesh", Industry Applications Magazine, IEEE, vol. 13, Issue: 2, pp. 62-72, Mar.-Apr. 2007.

Alberti, Luigi, et al., "Experimental Tests of Dual Three-Phase Induction Motor Under Faulty Operating Condition", Industrial Electronics, IEEE Transactions, Ind Electron, vol. 59, Issue: 5, pp. 2041-2048, May 2012.

Arumugam, Puvan, et al., "Analysis of Vertical Strip Wound Fault-Tolerant Permanent Magnet Synchronous Machines", Industrial Electronics, IEEE Transactions, vol. 61, Issue: 3, pp. 1158-1168, Mar. 2014.

GB Search Report issued in connection with corresponding GB Application No. GB1611124.7 dated Dec. 3, 2016.

Canadian Office Action issued in connection with corresponding CA Application No. 2933273 dated Sep. 1, 2017.

* cited by examiner

SHORT CIRCUIT FAULT TOLERANT PERMANENT MAGNET MACHINE

BACKGROUND

The subject matter disclosed herein relates to electric machines and, specifically, permanent magnet (PM) machines.

PM machines are used in various applications (e.g., aviation, propulsion motor for passenger vehicles, military ground vehicles, etc.) to convert between electrical power and mechanical power. Conventional PM synchronous electric machines employ permanent magnets as the magnetic poles of a rotor, around which a stator is disposed. The stator has a plurality of teeth that face the rotor. Alternatively, the machine may be designed so that the rotor surrounds the stator. For high-speed operation, a retaining sleeve is usually wrapped around the magnets as needed to keep the magnets in place. The retaining sleeve may be shrink fit upon the magnets to ensure a non-slip fit. Usually the retaining sleeve is made of one whole metallic piece for structural integrity. When the coils formed on the stator are energized, a magnetic flux is induced by the voltage, creating electromagnetic forces between the stator and the rotor. These electromagnetic forces contain tangential and/or circumferential forces that cause the rotor to rotate. When a PM machine is operating in the generating mode and experiences a fault (e.g., a short circuit due to winding defects or defective components), it may not be possible to quickly stop the PM machine because it is externally driven by the mechanical system. A fault-tolerant PM machine may be capable of sustaining a fault condition indefinitely. However, typical approaches to increasing fault tolerance may negatively impact the torque density of the PM machine. As such, it would be beneficial to improve the fault tolerance of a PM machine without sacrificing torque density.

BRIEF DESCRIPTION

Certain embodiments commensurate in scope with the original claims are summarized below. These embodiments are not intended to limit the scope of the claims, but rather these embodiments are intended only to provide a brief summary of possible forms of the claims. Indeed, the claims may encompass a variety of forms that may be similar to or different from the embodiments set forth below.

In one embodiment, a permanent magnet (PM) machine includes a rotor and a stator assembly. The rotor includes a plurality of permanent magnets disposed about an axis of rotation. The stator assembly includes a stator body, a plurality of coil sides and a plurality of sintered iron magnetic wedges. The stator body includes a plurality of stator teeth defining a plurality of stator slots, each stator slot having an inside position and an outside position, such that each of the plurality of stator slots includes a first plurality of inside positions, and a first plurality of outside positions. The first plurality of coil sides are disposed in each of the first plurality of inside positions and the first plurality of outside positions. The first plurality of coil sides correspond to a first power phase. The first plurality of coil sides are electrically coupled to one another by a first plurality of end-coils. The plurality of sintered iron magnetic wedges are disposed at the openings of at least one stator slot of the plurality of stator slots.

In another embodiment, a permanent magnet (PM) machine includes a rotor and a stator assembly. The rotor includes a rotor hub, and a plurality of permanent magnets disposed about the rotor hub. The stator assembly includes a stator body, first, second, and third pluralities of coil sides, and a plurality of sintered iron magnetic wedges. The stator body includes a plurality of stator teeth defining a plurality of stator slots, each stator slot having an inside position and an outside position, such that the plurality of stator slots includes a first plurality of inside positions, a second plurality of inside positions, a third plurality of inside positions, a first plurality of outside positions, a second plurality of outside positions, and a third plurality of outside positions. The first plurality of coil sides are disposed in each of the first plurality of inside positions and the first plurality of outside positions, wherein the first plurality of coil sides correspond to a first power phase, wherein the first plurality of coil sides are electrically coupled to one another by a first plurality of end coils, and wherein the first plurality of coil sides are separated from one another by two stator teeth. The second plurality of coil sides are disposed in each of the second plurality of inside positions and the second plurality of outside positions, wherein the second plurality of coil sides correspond to a second power phase, wherein the second plurality of coil sides are electrically coupled to one another by a second plurality of end coils, and wherein the second plurality of coil sides are separated from one another by two stator teeth. The third plurality of coil sides are disposed in each of the third plurality of inside positions and the third plurality of outside positions, wherein the third plurality of coil sides correspond to a third power phase, wherein the third plurality of coil sides are electrically coupled to one another by a third plurality of end coils, and wherein the third plurality of coil sides are separated from one another by two stator teeth. The plurality of sintered iron magnetic wedges are disposed at the openings of at least one stator slot of the plurality of stator slots.

In a third embodiment, a permanent magnet (PM) machine includes a rotor and a stator assembly. The rotor includes a rotor hub and a set of 10*N permanent magnets disposed about the rotor hub. The stator assembly includes a stator body, three sets of coil sides, and a plurality of sintered iron magnetic wedges. The stator body includes 24*N stator teeth, wherein the stator teeth define 24*N stator slots, each stator slot having an inside position and an outside position, such that the 24*N stator slots include a first set of 8*N inside positions, a second set of 8*N inside positions, a third set of 8*N inside positions, a first set of 8*N outside positions, a second set of 8*N outside positions, and a third set of 8*N outside positions. The first set of 16*N coil sides disposed in each of the first set of 8*N inside positions and the first set of 8*N outside positions, wherein the first set of 16*N coil sides correspond to a first power phase. The first set of 16*N coil sides are electrically coupled to one another by a first set of end coils, and the first set of 16*N coil sides are separated from one another by two stator teeth. The second set of 16*N coil sides are disposed in each of the second set of 8*N inside positions and the second set of 8*N outside positions, wherein the second set of 16*N coil sides correspond to a second power phase. The second set of 16*N coil sides are electrically coupled to one another by a second set of end coils, and the second set of 16*N coil sides are separated from one another by two stator teeth. The third set of 16*N coil sides are disposed in each of the third set of 8*N inside positions and the third set of 8*N outside positions, wherein the third set of 16*N coil sides correspond to a third power phase. The third set of 16*N coil sides are electrically coupled to one another by a third set of end coils, wherein the third set of 16*N coil sides are separated from one another by two stator teeth. The plurality of sintered iron magnetic wedges are disposed at the openings of each of the plurality of stator slots. Wherein N is a positive integer.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Permanent magnet (PM) machines may be used to convert between electrical power and mechanical power. Typically, a rotor rotates within a stator, though it is also possible for the stator to be interior to the rotor. The rotor may include a plurality of magnets disposed circumferentially about a shaft. The stator may include one or more coil sides, which may be connected to a load. By rotating within the stator, the rotating magnets on the rotor induce a voltage in the coils. In other embodiments, the rotor may include coil sides and the stator may include a plurality of magnets. When a PM machine experiences a fault (e.g., a short circuit due to winding defects or defective components), the magnetic flux of the PM machine cannot be turned off, as with some other electric machines. Thus, the flux of the magnets may continue to add energy (e.g., heat) to the faulted winding by linking the short circuited winding or turn. Accordingly, a fault tolerant PM machine may be able to sustain a fault (e.g., a three-phase short circuit) condition indefinitely if the heat produced from winding resistive losses is less than or equal to the heat produced during rated operation. However, typical techniques for increasing fault tolerance can negatively impact the torque density of the PM machine. The techniques describe herein utilize sintered iron magnetic wedges and two-tooth concentrated winding topology in order to increase fault tolerance without sacrificing torque density.

Figure 1:
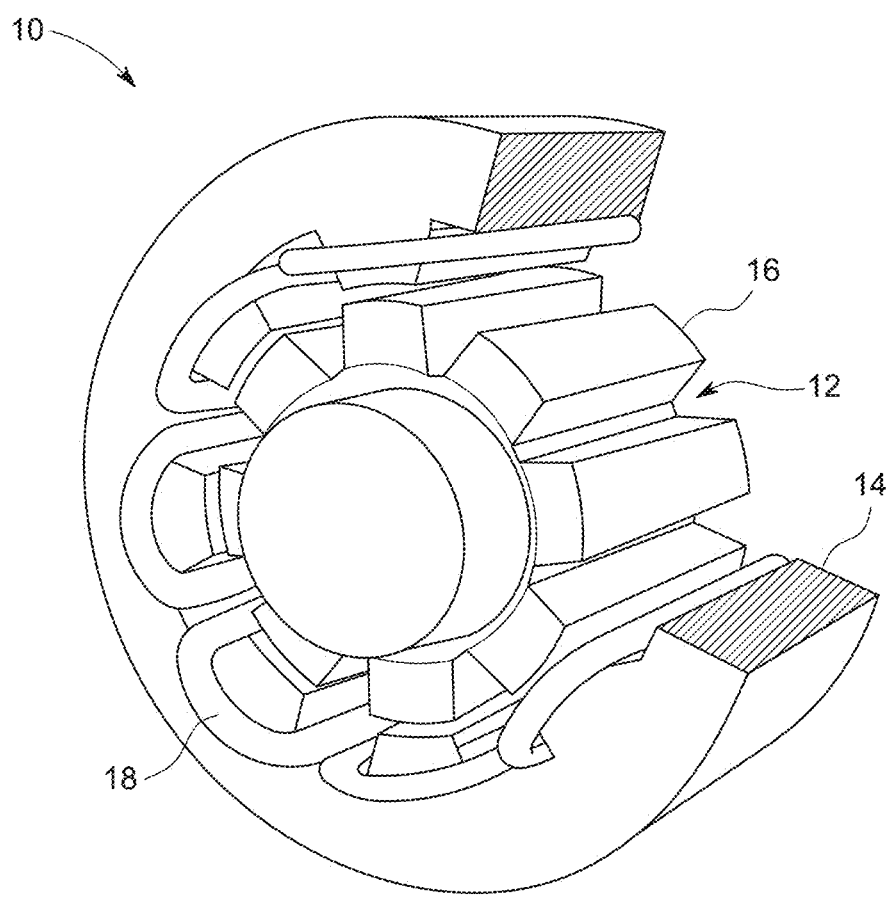
FIG. 1 is a cut-away view of one embodiment of a typical PM machine.

FIG. 1 is a cut-away view of one embodiment of a typical PM machine 10. The PM machine 10 includes a rotor 12 that rotates within a stator 14. The rotor 12 may include a plurality of permanent magnets 16. The stator may include coil sides 18. As the rotor 12 rotates within the stator 14, a voltage is created by way of magnetic induction, thus converting mechanical energy into electrical energy and vice-versa. It should be understood, however, that in some embodiments the placement of the magnets 16 and coil sides 18 may be reversed. That is, in some embodiments the coil sides 18 may be a part of the rotor 12 and the magnets 16 may be part of the stator 14. Additionally, coil sides 18 may not be actual coils of wire. For example, coil sides 18 may be vertical strips of a conductor (e.g., copper), stranded Litz wire, carbon nano-tube conductors, form-wound coils, or any other configuration that allows for voltage to be induced by the rotating permanent magnets.

Figure 2:
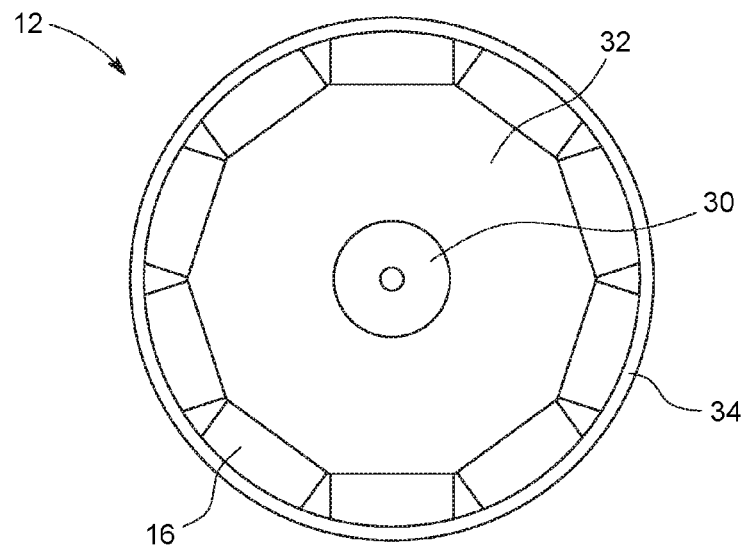
FIG. 2 is a section view of one embodiment of a rotor in accordance with aspects of the present disclosure.

FIG. 2 is a cross-section view of one embodiment of a rotor 12. In the present embodiment, the rotor 12 includes a shaft 30. Surrounding the shaft 30 is a rotor hub 32. The rotor hub 32 may be laminated magnetic steel, a solid machined forging of magnetic steel, or some other magnetic material. In the embodiment shown in FIG. 2, the rotor 12 includes a rotor hub 32 having the cross-sectional shape of a 10-sided regular polygon. In other embodiments, the cross-sectional shape of the rotor hub 32 may be circular, triangular, square, pentagonal, hexagonal, octagonal, or a regular or irregular polygon having any number of sides. For example, in some embodiments, the rotor hub 32 may have the cross-sectional shape of a polygon with 3, 4, 5, 6, 7, 8, 9, 10, 11, 12, 13, 14, 15, 16, 17, 18, 19, 20, or more sides. In some embodiments, the shaft 30 and rotor hub 32 may be a single part. As shown in FIG. 2, a plurality of permanent magnets 18 (or "poles"), are disposed about the rotor hub 32. In the embodiment shown in FIG. 2, the number of poles 18 is equal to the number of sides of the cross-sectional shape of the rotor hub 32. However, in other embodiments the number of poles may be more or less than there are number of sides of the cross-sectional shape of the rotor hub 32. For example, the rotor hub 32 may be circular in shape with 10 poles 18 disposed about the rotor hub 32. In other embodiments, the cross-sectional shape of the rotor hub 32 may be a 20-sided polygon, with 10 poles 16 disposed about the rotor hub 32. The rotor 12 shown in FIG. 2 also includes a retaining sleeve 34 surrounding the permanent magnets 16. It should be understood, however, that some embodiments of the rotor 12 may not include a retaining sleeve 34. Though a surface permanent magnet (SPM) configuration is shown in FIG. 2, wherein the permanent magnets 16 are disposed about the rotor hub 32, some embodiments may use an interior permanent magnet (IPM) configuration. That is, in some embodiments, the permanent magnets 16 may be disposed within the rotor hub 32 or the shaft 16.

Figure 3:
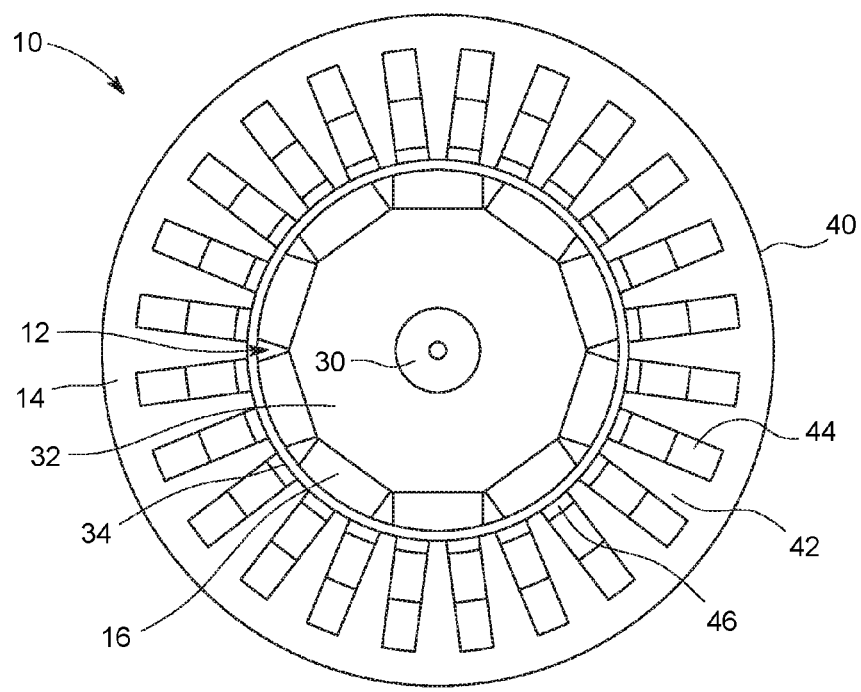
FIG. 3 is a cross-sectional view of one embodiment of a 24-slot, 10-pole, 3-phase PM machine in accordance with aspects of the present disclosure.

FIG. 3 is a cross-sectional view of one embodiment of a 24-slot, 10-pole, 3-phase PM machine 10 having a rotor 12 and a stator 14. It should be understood that for the sake of clarity, the winding topology is not shown in FIG. 3. The winding topology will be discussed in detail with regard to FIG. 4. The stator 14 may include a stator body 40 having a plurality of stator teeth 42 that define a plurality of stator slots 44. The embodiment shown in FIG. 3 includes 24 teeth 42 and 24 slots 44. Because the embodiment shown in FIG. 3 includes 10 magnetic poles 16 and 24 stator slots 44, it is referred to as a "24-slot, 10-pole PM machine." It should be understood, however, that in some embodiments the stator body 40 may have any number of slots 44 and teeth 42 such that the PM machine 10 has a fractional number of stator slots-per-pole (i.e., a "fractional" PM machine 10). For example, the stator body 40 may have 3, 6, 8, 9, 10, 12, 14, 15, 16, 18, 20, 21, 22, 24, 26, 27, 28, 30, 32, 33, 36, 38, 40, or any other number of teeth 42 and slots 44 as long as the number of slots is not evenly divisible by the number of poles. Alternatively, some embodiments may multiply the number of elements by an integer, N. For example, one embodiment of the PM machine 10 may have 24*N slots and 10*N poles, wherein N is any positive integer. In other embodiments, the number of slots may be evenly divisible by the number of poles (i.e., an "integral" PM machine 10). For example, in one embodiment, the PM machine 10 may have 4 magnetic poles 16 and 24 slots 44, or any other number of slots and poles, such that the number of slots is evenly divisible by the number of poles.

The stator slots 44 shown in FIG. 3 are open (i.e., the width of each opening is as wide as the slot 44). Accordingly, unlike stators in some PM machines, the teeth 42 of the stator 14 shown in FIG. 3 do not have tangs. The open stator slots 44 allow for coil sides 18 to be partially or fully formed ahead of time and then dropped into the stator slots 44. This may result in cost savings in manufacturing the stator 14. End coils may connect coil sides 18 and wrap around the stator teeth 42 in a concentrated two-tooth winding topology that will be described in more detail with regard to FIG. 4. As is shown in FIG. 3, the stator slots 44 may be divided into two or more sections to allow for multiple phases of coil sides 18, separated by an insulator, to occupy a single stator slot 44.

Magnetic wedges 46 may be placed at the openings of the stator slots 44 to keep the coil sides 18 in place. Typically, the leakage inductance of a stator 14 may be tuned by adjusting the design or the stator tooth 42 tangs. Though the present embodiment lacks stator tooth 42 tangs, the leakage inductance may be tuned by adjusting the design of the magnetic wedges 46. In some embodiments, the magnetic wedges 46 may be made of a sintered powdered iron material mixed with fillers. Using a sintered powdered iron material mixed with fillers results in a magnetic wedge with good relative magnetic permeability, but low electrical conductivity. Additionally, use of a sintered powdered iron material allows magnetic wedges 46 to be designed with a wide range of relative magnetic permeability properties by varying the amount of iron. In contrast, magnetic wedges made with other materials and/or processes, such as Vetroferrite®, may have limited ranges of relative permeability due to the use of non-magnetic materials as fillers. For example, a magnetic wedge 46 may have a relative permeability ($\mu_r$) of 1, 3, 5, 8, 10, 14, 20, 25, 30, 38, 48, 60, 72, 85, 100, or any other number greater than, less than, or between the listed values, wherein the relative permeability of air is 1.

In typical stator 14 designs, the use of open stator slots 44 lowers the net flux-linkage of the stator winding and the leakage inductance, which in turn reduces the torque density and increases the short circuit current of the machine. However, the use of magnetic wedges 46 increases the torque density of the machine while also increasing the leakage inductance of the machine design when compared to a similar design without magnetic wedges. In some embodiments, the magnetic wedges 46 may be coated to prevent dusting or erosion due to vibration during operation. The coating may be metal, thermoset, thermoplastic, a composite, or any other material used to prevent erosion of the magnetic wedges 46. It should be understood, however, that in some embodiments the magnetic wedges 46 may not be coated.

Figure 4:
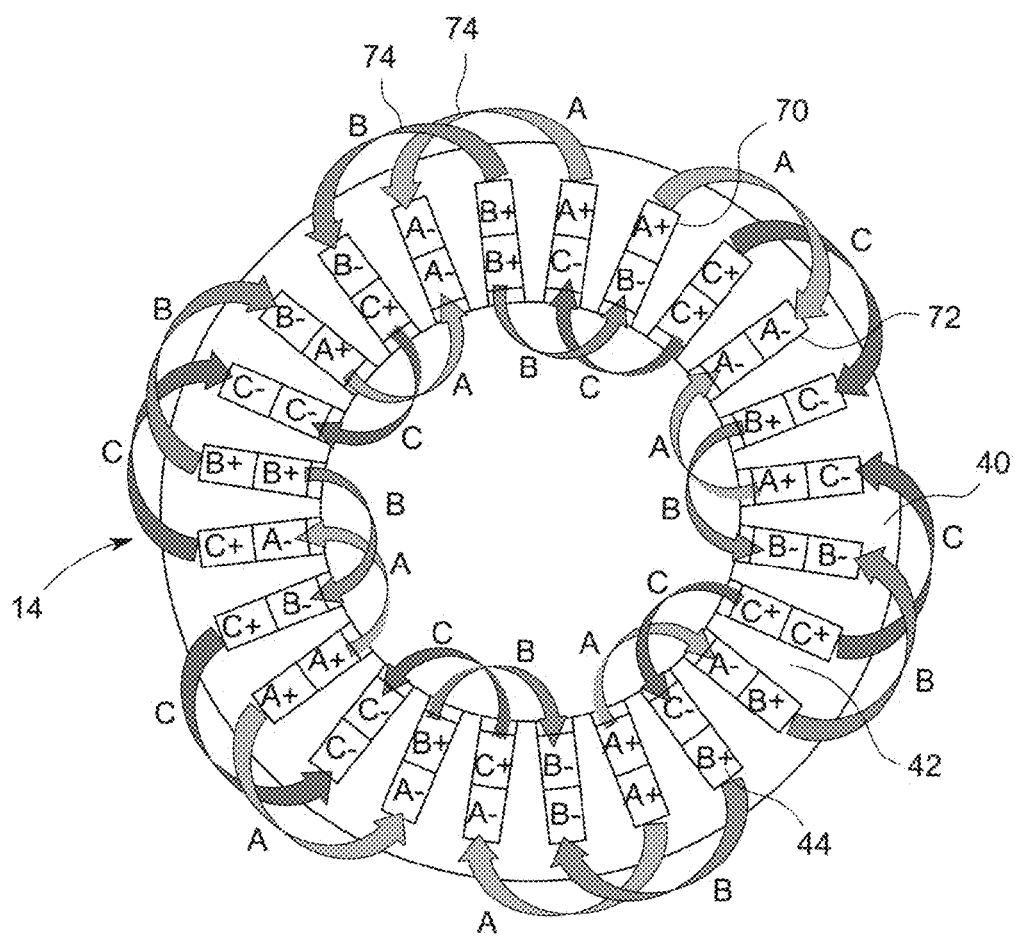
FIG. 4 is a diagram of one embodiment of a 2-tooth concentrated winding topology for a 24-slot, 10-pole, 3-phase PM machine in accordance with aspects of the present disclosure.

FIG. 4 is a diagram of one embodiment of a 2-tooth concentrated winding topology for a 24-slot, 10-pole, 3-phase PM machine 10. Though fully concentrated winding topologies typically span a single stator tooth 42, in the 2-tooth concentrated winding topology shown in FIG. 4, the end coils 74 connecting the coil sides 18 span 2 stator teeth 42. As previously discussed, the stator slots 44 may be divided into two sections, as shown in FIG. 4, allowing 2 coil sides 18, which may be of different phases, to share a stator slot 44. In such an embodiment, an insulator may be used between the coil sides 18 in order to avoid contact between end coils 74. For example, in some embodiments, the coil sides 18 may include stranded Litz wire compacted into a rectangular cross-section and coated with an insulator. In other embodiments, the divider may be an insulator. For example, the open stator slots 44 with an insulating divider may allow individual coil sides 18 to be formed outside of the stator 14, dropped into the stator slots 44, and then brazed. This "drop in" coil configuration facilitates the use of rectangular vertical strips of copper for winding rectangular-shaped turns, which may limit the peak current during turn-to-turn short circuit faults. The various coil sides 18 may be connected using end coils 74 as shown in FIG. 4.

In general, the winding topology has two separate winding patterns that are shifted with respect to one another and then connected in series. In FIG. 4, the 3 phases are represented by A, B, and C. As shown in FIG. 4, an end coil 74 attaches to the positive coil side 70 of one phase (e.g., A+), spans 2 teeth (i.e., "2-tooth throw"), and then connects to the negative coil side 72 of the same phase (e.g., A−). The end coils 74 are then connected in series or parallel.

As shown in FIG. 4, the outside end coils 74 may be paired such that both end coils 74 of a pair go the same direction. The directions of the end coil 74 pairs alternate as one moves around the exterior of the stator 14 between clockwise and counterclockwise. Additionally, each of the pairs of end coils 74 along the exterior of the stator include end coils 74 of two different phases. Accordingly, as one moves around the outside of the stator 14 in a clockwise direction, the phase pattern of the coil sides 70 is A+, A+, C+, A−, C−, C−, B−, C+, B+, B+, A+, B−. The pattern then repeats, but with opposite polarities, A−, A−, C−, A+, C+, C+, B+, C−, B−, B−, A−, B+.

The inside end coils 74 may be paired such that both end coils 74 of a pair go in opposite directions. The pairs alternate as one moves around the interior of the stator 14 between inside-out, and outside-in. As with the outside end coils 74, each of the pairs of end coils 74 along the interior of the stator include end coils 74 of two different phases. Accordingly, as one moves around the inside of the stator 14 in a clockwise direction, the phase pattern of the coil sides 70 is C−, B−, C+, A−, B+, A+, B−, C+, A−, C−, A+, B−. As with the outside coil sides 70, the pattern repeats, but with opposite polarities, C+, B+, C−, A+, B−, A−, B+, C−, A+, C+, A−, B+.

The 2-tooth concentrated winding topology shown in FIG. 4 provides a compromise between fully-concentrated winding and distributed winding. Specifically, the winding topology limits the electromagnetic losses of the rotor by minimizing the magneto-motive force (MMF) space harmonics that would otherwise be produced by a fully concentrated winding. The concentrated coils also limit electromagnetic coupling between phase end coils 74 to limit short circuit currents. However, some phase-to-phase isolation is preserved due to the short pitch angle of the concentrated winding and careful shaping of the end-regions of the phase end coils 74.

It should be understood, however, that the disclosed techniques are not limited to the specific winding pattern shown in FIG. 4. Embodiments having stators 14 with greater than or less than 24 stator slots 44 may have slightly different winding patterns to accommodate different numbers of stator slots 44 and stator teeth 42, or different numbers of poles 16 and or phases. In such embodiments, a given end coil 74 will still connect a to positive coil side 70 to a negative coil side 72, and may or may not cross two stator teeth 42.

Figure 5:
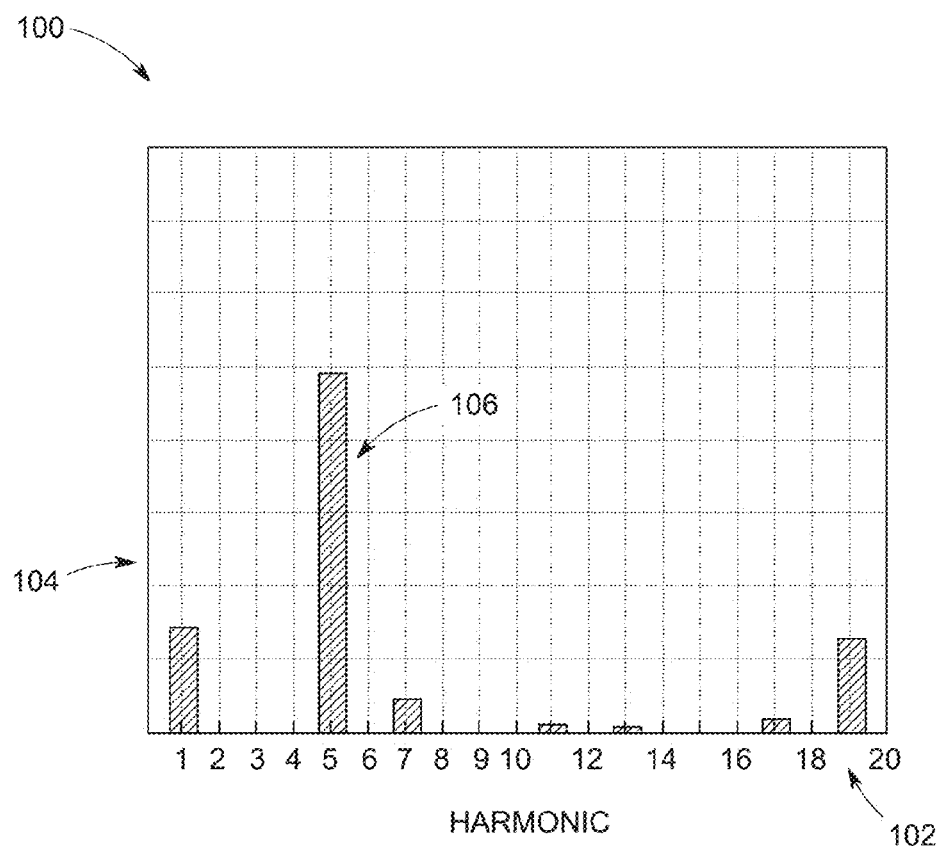
FIG. 5 is a plot of the MMF space harmonics produced by a 24-slot, 10-pole, 3-phase PM machine with a 2-tooth concentrated winding topology in accordance with aspects of the present disclosure.

FIG. 5 is a plot 100 of the MMF space harmonics produced by a 24-slot, 10-pole, 3-phase PM machine 10 with the 2-tooth concentrated winding topology shown in FIG. 4. The x-axis 102 represents the various harmonics and the y-axis 104 represents the MMF space harmonic magnitude produced by the stator winding 10. In general, a single harmonic produces torque. The other harmonics are considered parasitic. Generally, it is desirable to have a high torque-producing MMF space harmonic, but minimal parasitic harmonics. Note that in the plot 100 of FIG. 5 the fifth harmonic 106 is the torque producing harmonic and the remaining parasitic MMF space harmonics are low. Accordingly, the 24 slot, 10 pole PM machine 10 with the winding topology shown in FIG. 4 is a fault tolerant PM machine that also limits the parasitic MMF space harmonics.

The torque values and steady-state 3-phase short circuit currents of several embodiments of a 24-slot, 10 pole fractional PM machine 10 are set out below in Table 1.

TABLE 1

| Current ($A_{rms}$) | Semi-Closed Slot | Non-Linear Permeability Wedge ($\mu_r = 60$) | Non-Linear Permeability Wedge ($\mu_r = 14$) | Linear Permeability Wedge ($\mu_r = 3$) | Linear Permeability Wedge ($\mu_r = 1$) |
|---|---|---|---|---|---|
| | | Torque (Nm) | | | |
| 270 | 125.27 | 121.70 | 121.23 | 119.18 | 113.85 |
| 600 | 249.93 | 252.81 | 262.31 | 262.66 | 252.91 |
| | Steady-State 3-Phase Short Circuit Current ($A_{rms}$) | | | | |
| | 290 | 250 | 320 | 370 | 450 |

The "semi-closed slot" PM machine refers to a PM machine that does not use magnetic wedges 46. In such a design, a PM machine has a stator body in which the stator teeth 42 have tangs and the stator slots 44 are semi-closed. The remaining embodiments referred to in Table 1 have a stator body with open stator slots and magnetic wedges 46 of varying relative magnetic permeability. As compared to the semi-closed slot design, the torque production at a current of 270 $A_{rms}$ is only slightly lower in designs with open stator slots 44 and magnetic wedges 46 than the semi-closed slot design. At 600 $A_{rms}$ the torque production of the designs with open stator slots 44 and magnetic wedges 46 are improved as compared to a semi-closed slot design. As is shown in Table 1, as the relative magnetic permeability ($\mu_r$) of the magnetic wedge 46 approaches a value of 60, the steady-state 3-phase short circuit current falls. Using a magnetic wedge having a relative magnetic permeability of 60, the steady-state 3-phase short circuit current of the PM machine is 40 $A_{rms}$ lower than the semi-closed slot design.

Similarly, the torque values and steady-state 3-phase short circuit currents of several embodiments of a 24-slot, 4-pole integral PM machine 10 are set out below in Table 2. Though the 24-slot, 4-pole integral PM machine 10 has a 5-tooth throw winding topology, it should be understood that other winding topologies may be possible.

TABLE 2

| Current ($A_{rms}$) | Semi-Closed Slot | Non-Linear Permeability Wedge ($\mu_r = 60$) | Non-Linear Permeability Wedge ($\mu_r = 14$) | Linear Permeability Wedge ($\mu_r = 3$) | Linear Permeability Wedge ($\mu_r = 1$) |
|---|---|---|---|---|---|
| | | Torque (Nm) | | | |
| 270 | 96.79 | 95.52 | 95.08 | 94.68 | 92.34 |
| 600 | 213.81 | 210.58 | 210.56 | 210.28 | 205.26 |
| | Steady-State 3-Phase Short Circuit Current ($A_{rms}$) | | | | |
| | 740 | 760 | 830 | 820 | 960 |

As discussed with regard to Table 1, the "semi-closed slot" PM machine in Table 2 refers to a PM machine that having a stator body in which the stator teeth 42 have tangs and the stator slots 44 are semi-closed rather than sintered iron magnetic wedges. The remaining embodiments referred to in Table 2 have a stator body with open stator slots and sintered magnetic wedges 46 of varying relative magnetic permeability. As compared to the semi-closed slot design, the torque production at currents of 270 $A_{rms}$ and 600 $A_{rms}$ is only slightly lower in designs with open stator slots 44 and magnetic wedges 46 than the semi-closed slot design. As is shown in Table 2, as the relative magnetic permeability ($\mu_r$) of the magnetic wedge 46 approaches a value of 60, the steady-state 3-phase short circuit current falls. Using a magnetic wedge having a relative magnetic permeability of 60, the steady-state 3-phase short circuit current of the PM machine is similar to the semi-closed slot design.

The use of sintered powdered iron magnetic wedges 46 with the 2-tooth concentrated winding topology discussed with regard to FIG. 4 results in a fault-tolerant PM machine 10 that does not sacrifice torque density. The disclosed techniques allow the designer of a PM machine 10 to tune the leakage inductance of the winding, thereby limiting the short circuit current of the machine, without sacrificing torque density. Additionally, the disclosed techniques may reduce torque ripple. The resulting PM machine may be capable of sustaining a 3-phase short circuit indefinitely. A stator body 40 having open slots 44 also allows for the PM machine's 10 coil sides 18 to be manufactured outside of the stator 14 and then inserted into the stator slots 44. The use of sintered powdered iron magnetic wedges allows the designer more control in tuning the leakage inductance as compared to other magnetic wedges (e.g., Vetroferrite®) or semi-closed slot designs. Coating the sintered powdered iron magnetic wedges 46 may prevent erosion or dusting due to vibration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A permanent magnet (PM) machine comprising:
   a rotor comprising 10*N permanent magnets disposed about an axis of rotation; and
   a stator assembly comprising:
      an annular stator body comprising 24*N stator teeth disposed circumferentially about the stator body, and extending radially inward from the stator body relative to a central axis of the stator body, wherein the stator teeth define 24*N stator slots, each stator slot disposed between adjacent stator teeth;
      a first set of 16*N coil sides, wherein each coil side of the first set of coil sides is disposed in a respective stator slot of a first set of the 24*N stator slots, wherein each of the 24*N stator slots is configured to receive two coil sides disposed radially adjacent to one another relative to the central axis of the stator body, wherein the first set of coil sides correspond to a first power phase, wherein the first set of coil sides are electrically coupled to one another by a first set of 16*N respective end coils, and wherein the first set of coil sides are separated from one another by two stator teeth; and
      a plurality of sintered iron magnetic wedges, each disposed at an opening of at least one stator slot of the 24*N stator slots;
   wherein N is a positive integer, and wherein the PM machine has a fractional number of stator slots, per a number of permanent magnet poles.

2. The PM machine of claim 1, wherein a relative magnetic permeability of the sintered iron magnetic wedges is 10 or greater.

3. The PM machine of claim 1, wherein each of the plurality of sintered iron magnetic wedges comprises a coating of at least one material or combination materials or composite material of metal, thermoset, or thermoplastic.

4. The PM machine of claim 1, wherein the stator assembly comprises:
   a second set of 16*N coil sides, wherein each coil side of the second set of coil sides is disposed in a respective stator slot of a second set of the 24*N stator slots, wherein the second set of coil sides correspond to a second power phase, wherein the second set of coil sides are electrically coupled to one another by a second set of 16*N respective end coils, and wherein the second set of coil sides are separated from one another by two stator teeth; and
   a third set of 16*N coil sides, wherein each coil side of the third set of coil sides is disposed in a respective stator slot of a third set of the set of 24*N stator slots, wherein the third set of coil sides correspond to a third power phase, wherein the third set of coil sides are electrically coupled to one another by a third set of 16*N respective end coils, and wherein the third set of coil sides are separated from one another by two stator teeth.

5. The PM machine of claim 1, wherein the first set of coil sides are configured to be inserted into the respective openings of the first set of the 24*N stator slots, and brazed.

6. The PM machine of claim 1, wherein each coil side of the first set of coil sides comprises a strip of copper.

7. The PM machine of claim 1, wherein adjacent coil sides disposed within at least one of the 24*N stator slots are separated by an insulator.

8. The PM machine of claim 4, wherein the first, second, and third sets of coil sides are arranged, as in claim 4, such that the PM machine may sustain a 3-phase short circuit current indefinitely.

9. A permanent magnet (PM) machine comprising:
   a rotor comprising:
      a rotor hub; and
      10*N permanent magnets disposed about the rotor hub;
   a stator assembly comprising:
      an annular stator body comprising 24*N stator teeth disposed circumferentially about the stator body, and extending radially inward from the stator body relative to a central axis of the stator body, wherein the 24*N stator teeth define 24*N stator slots, each stator slot disposed between adjacent stator teeth, such that each stator slot of the 24*N stator slots comprises:
         an inside position; and
         an outside position disposed radially outside of the inside position relative to the central axis of the stator body;
      a first set of 16*N coil sides, wherein each coil side of the first set of coil sides is disposed in the inside position or the outside position of a respective stator slot of a first set of the 24*N stator slots, wherein the first set of coil sides correspond to a first power phase, wherein the first set of coil sides are electrically coupled to one another by a first set of 16*N respective end coils, and wherein the first set of coil sides are separated from one another by two stator teeth;
      and
      a plurality of sintered iron magnetic wedges, each disposed at an opening of at least one stator slot of the 24*N stator slots;
   wherein N is a positive integer, and wherein the PM machine has a fractional number of stator slots, per a number of permanent magnet poles.

10. The PM machine of claim 9, wherein the first set of coil sides are configured to be inserted into the respective openings of the first set of the 24*N stator slots, and brazed.

11. The PM machine of claim 9, wherein a relative magnetic permeability of the sintered iron magnetic wedges is 10 or greater.

12. The PM machine of claim 9, wherein the inside position and the outside position of each stator slot are separated by an insulator.

13. A permanent magnet (PM) machine comprising:
   a rotor comprising:
      a rotor hub; and
      a set of 10*N permanent magnet poles disposed about the rotor hub;
   a stator assembly comprising:
      an annular stator body comprising 24*N stator teeth disposed circumferentially about the stator body, and extending radially inward from the stator body relative to a central axis of the stator body, wherein the stator teeth define 24*N stator slots, each stator slot disposed between adjacent stator teeth, such that each stator slot the 24*N of stator slots comprise:
an inside position; and
an outside position disposed radially outside of the inside position relative to the central axis of the stator body;
a first set of 16*N coil sides, wherein each coil side of the first set of coil sides is disposed in the inside position or the outside position of a respective stator slot of a first set of the stator slots, wherein the first set of 16*N coil sides correspond to a first power phase, wherein the first set of 16*N coil sides are electrically coupled to one another by a first set of end coils, and wherein the first set of 16*N coil sides are separated from one another by two stator teeth;
a second set of 16*N coil sides, wherein each coil side of the second set of coil sides is disposed in the inside position or the outside position of a respective stator slot of a second set of the stator slots, wherein the second set of 16*N coil sides correspond to a second power phase, wherein the second set of 16*N coil sides are electrically coupled to one another by a second set of end coils, and wherein the second set of 16*N coil sides are separated from one another by two stator teeth;
a third set of 16*N coil sides, wherein each coil side of the third set of coil sides is disposed in the inside position or the outside position of a respective stator slot of a third set of the stator slots, wherein the third set of 16*N coil sides correspond to a third power phase, wherein the third set of 16*N coil sides are electrically coupled to one another by a third set of end coils, and wherein the third set of 16*N coil sides are separated from one another by two stator teeth; and
a plurality of sintered iron magnetic wedges, each disposed at an opening of each of the plurality of stator slots;
wherein N is a positive integer;
wherein the PM machine has a fractional number of stator slots, per a number of permanent magnet poles.

14. The PM machine of claim 13, wherein the first plurality of coil sides are configured to be inserted into the respective openings of the first set of the stator slots, and brazed.

15. The PM machine of claim 13, wherein a relative magnetic permeability of the sintered iron magnetic wedges is 10 or greater.

16. The PM machine of claim 13, wherein the inside position and the outside position of each stator slot are separated by an insulator.

* * * * *